United States Patent
Muziol et al.

(10) Patent No.: US 6,860,635 B2
(45) Date of Patent: Mar. 1, 2005

(54) SENSOR AND HOUSING WITH ADJUSTABLE SPACING ELEMENT

(75) Inventors: Matthias Muziol, Seligenstadt (DE); Michael Hoschkara, Lampertheim (DE); Gerhard Damaschke, Flörsheim (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 72 days.

(21) Appl. No.: 10/094,225

(22) Filed: Mar. 8, 2002

(65) Prior Publication Data

US 2002/0125984 A1 Sep. 12, 2002

(30) Foreign Application Priority Data

Mar. 8, 2001 (DE) .......................................... 101 11 336

(51) Int. Cl.⁷ .......................... G01K 7/00; H01C 3/043
(52) U.S. Cl. ..................... 374/185; 374/163; 374/208; 338/28
(58) Field of Search ............................... 374/163, 183, 374/185, 208, 179; 73/886.1; 338/252, 253, 28; 29/612, 613; 136/230, 235, 242

(56) References Cited

U.S. PATENT DOCUMENTS

| | | | | |
|---|---|---|---|---|
| 3,913,058 A | * | 10/1975 | Nishio et al. .................. 338/28 |
| 4,183,248 A | * | 1/1980 | West ........................... 338/28 |
| 4,243,968 A | * | 1/1981 | Scott ........................... 29/613 |
| 4,904,091 A | * | 2/1990 | Ward ........................... 374/179 |
| 5,117,089 A | * | 5/1992 | Honkomp et al. ......... 338/22 R |
| 5,262,619 A | * | 11/1993 | Karner ...................... 338/22 R |
| 5,720,556 A | * | 2/1998 | Krellner ...................... 374/185 |
| 6,130,598 A | * | 10/2000 | Katsuki et al. ............. 374/185 |

FOREIGN PATENT DOCUMENTS

| | | | |
|---|---|---|---|
| DE | 3827937 A1 | 2/1990 | |
| DE | 4234133 A1 | 4/1994 | |
| DE | 42 41 242 A1 | 6/1994 | |
| DE | 19544815 C1 | 4/1997 | |
| DE | 197 47 977 A1 | 5/1999 | |
| DE | 4243261 C2 | 8/1999 | |
| DE | 199 01 935 A1 | 10/1999 | |
| DE | 19901935 A1 * | 10/1999 | ............ G01K/1/14 |
| EP | 0 772959 B1 | 3/1998 | |
| FR | 2 660 431 A1 | 10/1991 | |

OTHER PUBLICATIONS

Derwent Acc. No. 1999–303579, English Abstract and Drawing Description of DE 19747977A.*
Derwent Acc. No. 1999–621530, English Abstract and Drawing Description of DE 19901935A.*

* cited by examiner

Primary Examiner—Diego Gutierrez
Assistant Examiner—Stanley J. Pruchnic, Jr.
(74) Attorney, Agent, or Firm—Akin Gump Strauss Hauer & Feld, L.L.P.

(57) ABSTRACT

A sensor, especially a temperature sensor, has a measuring resistor (7) including a substrate with an electrically insulating surface and a resistor layer situated thereon, which is enclosed by a housing (6) having current lead-ins to a plug system (1) for connection leads or contact pins (10) in a region of the housing facing away from the measurement. The measuring resistor (7) is arranged in the region of an end (14) of the housing facing the measurement, and between the measuring resistor (7) and the contact pins (10) at least one spacing element (9) of electrically insulating material is provided with lateral recesses for guiding the electrical connection leads (12) which extend from the measuring resistor (7). The temperature sensor can be simply adapted by variable configuration of the plug system and spacing element to various types of customer-specific requirements.

16 Claims, 2 Drawing Sheets

SENSOR AND HOUSING WITH ADJUSTABLE SPACING ELEMENT

BACKGROUND OF THE INVENTION

The invention relates to a sensor, especially a temperature sensor, having at least one sensor element and a housing enclosing the sensor element. In a region facing away from the sensor element the housing has current lead-ins connecting the electrical connection leads of the sensor elements to outer connection leads. The sensor element is arranged in a region of the housing facing the measurement. Between the sensor element and the current lead-ins there is provided at least one spacing element made of electrically insulating material and having recesses for guiding the connection leads between the sensor element and the current lead-ins. The invention also relates to use of the sensor.

From German published patent application DE 38 27 937 A1, a sensor pick-up is known which comprises a measuring circuit with a sensor element which is enclosed by a housing. The housing is provided with a cap-like connection element, which accommodates one end of a connection cable. Inside the housing thereof, the measuring circuit is connected with the connection cable through a multi-branch, flexible conducting piece. Here, the conducting piece and the sensor element are situated on a support member, wherein the conducting piece and the branches of the connection cable projecting out of the connection element are directly connected with one another. The comparatively complex construction, as well as the fixed connection between the connection cable and the sensor pick-up, proves to be problematic, so that a flexible use or a customer-specific adaptation of the sensor is possible only with difficulty.

From European Patent EP 0 772 959 B1, a water-tight housing with a plug connection is known for protection of electronic circuits, wherein the housing has an upper part and a lower part, and between the two parts, an injected sealant of soft plastic is provided, which is inserted between the upper and lower parts made of hard plastic. The housing has a plug element, whose inner part made of hard plastic contains contact pins and is constructed in one piece with the upper and lower parts, wherein the plug part has a sealing collar of soft plastic enclosing its inner part. The comparatively complex construction, as well as the relatively strong encapsulation of electronic components, proves to be problematic so that, for example, an electronic temperature monitoring by means of a built-in sensor element is possible only with difficulty. Furthermore, due to the complex structure, a customer-specific adaptation of the design is not possible without further ado.

BRIEF SUMMARY OF THE INVENTION

An object of the invention is to create a sensor with a sensor housing, which is to be adapted to customer-specific requirements in a simple manner. In addition, by configuration of the internal structure a simple and secure contacting of a sensor element, especially a measuring resistor, should be made possible, which is also installable in an automated production.

The object is accomplished in that the connection leads with their free ends project from the end of the spacing element facing away from the measurement, and the free ends of the connection leads extend up to contact pins provided as current lead-ins and are joined electrically and mechanically fast with these.

It proves to be advantageous with the sensor of the invention that it is possible to position the measuring resistor along the longitudinal axis and to connect the connection leads exactly with contact pins of a plug-in system, optionally customer specific. Due to such an internal structure, it is possible to insert an installation aid or device integrated into the sensor, which makes possible an economical manufacture of the sensor with a high degree of automation.

A further advantage is to be seen in that, by variable inserts in an injection mold, the cross section and length of the spacing element can be adapted to the respective measuring resistor.

In a preferred embodiment of the sensor, the contact pins are passed hermetically tight through the housing to the outside.

The sensor is advantageously constructed such that, viewed from the current lead-in of the connection leads, the spacing element tapers in cross section in the direction of the sensor element, and the recesses are arranged in opposite-lying lateral surfaces of the spacing element, whereby they accommodate the electrical connection leads extending from the sensor element.

The spacing element is advantageously constructed by injection on a plug as a plastic pin with two guide grooves.

In a preferred embodiment, the spacing element is at least partially constructed in the shape of a prism, wherein the recesses are constructed as grooves in lateral surfaces whose planes intersect outside the housing. The sensor housing has a closed end, which is provided for accommodation of the measuring resistor. Preferably, the housing is constructed at least partially rotation-symmetrical. Here, the housing has a part made of metal facing the measurement and a part with a plug system facing away from the measurement, the plug system comprising mainly electrically insulating material. The plug system is connected mechanically fast with the spacing element. As an electrically insulating material of the housing, plastic is used.

In a preferred embodiment of the sensor element, this is constructed as a temperature-dependent measuring resistor comprising a substrate with an electrically insulating surface and a resistance layer situated thereon.

It prove to be advantageous that the manufacture of the sensor can be undertaken with a standardized tool, whereby the degree of automation is very high due to the spacing element.

The object of the invention is accomplished in accordance with the use of the sensor as a temperature sensor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1b is a cross section through the sensor along line A—A in FIG. 1a; and

DETAILED DESCRIPTION OF THE INVENTION

Figure 1A:
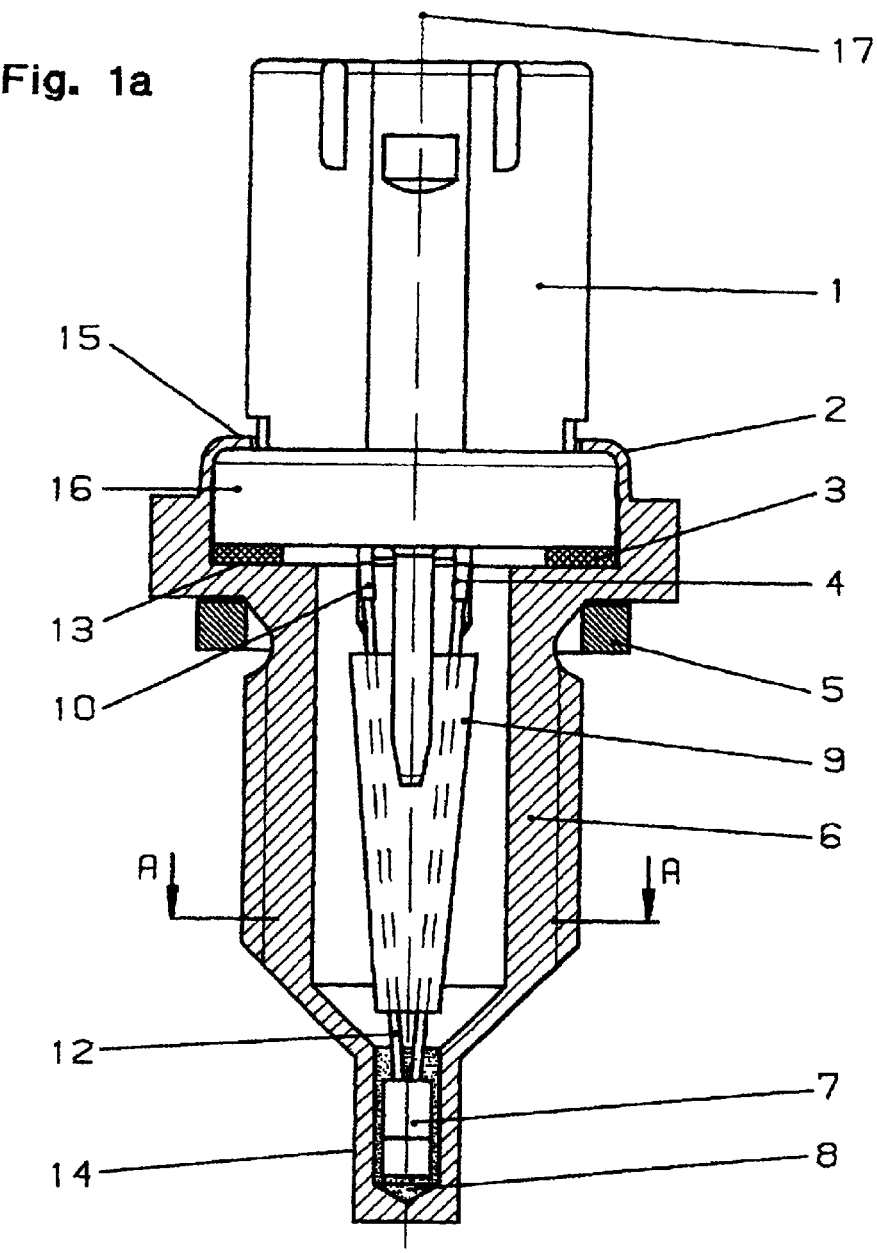
FIG. 1a is longitudinal section view of a sensor of the invention.

In accordance with FIG. 1a, the sensor, viewed along its longitudinal axis 17, has a basically rotation-symmetrical housing 6 with a closed end 14 and an opposite-lying open end 15, wherein the actual measuring resistor 7 is situated in the closed end 14. The open end 15 of the housing 6 is closed off by an expanded element 16 of a plug system 1, wherein the expanded element 16 of the system 1 is held by a lateral flanging 2 on the facing away side of the housing 6 and is simultaneously pressed by means of an inner seal 3 against an annular inner flange 13 of the housing 6 for the purpose of sealing.

The plug system 1 is, as a rule, constructed customer-specifically, wherein ends of contact pins 10 of the plug system protrude into the interior of housing 6 and are connected electrically and mechanically fast with electrical connection leads 12 of the measuring resistor 7 at the connection points 4. It is, however, also possible, instead of the ends of the contact pins 10, to use additional plug-connection leads, which are directly connected with the contact pins.

Figure 1B:
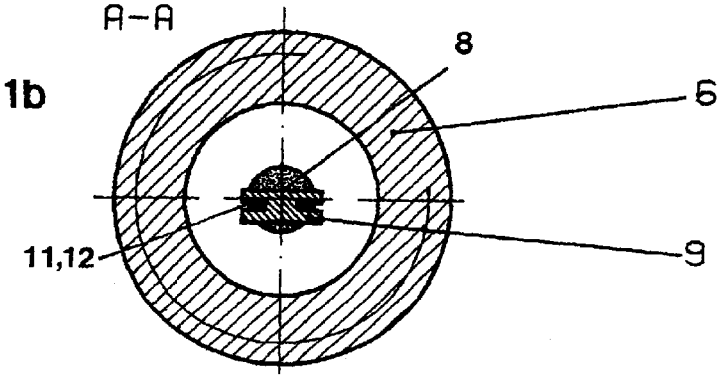

Between the connection points 4 and the measuring resistor 7, a spacing element 9 connected with the plug system 1 is arranged which has opposite-lying recesses 11, which are recognizable in FIG. 1b. Plug system 1 and spacing element 9 are made substantially of plastic, while the part of the housing 6 facing the measurement is made of metal.

The cross section shown in FIG. 1b illustrates the spacing element 9 with the groove-shaped recesses 11 in which the electrical connection leads 12 for the measuring resistor are arranged. Furthermore, the heat-conducting paste 8 surrounding the measuring resistor is recognizable. With the aid of the spacing element 9, it is possible, in accordance with FIG. 1a, to ensure a stable positioning of the measuring resistor 7 in the tapered region of the closed end 14 of housing 6. The heat-conducting paste 8 is situated between measuring resistor 7 and the closed end 14 of housing 6, which ensures a rapid rate of response of the sensor.

In an embodiment especially important for practice, the measuring resistor and the spacing element are adjusted to each other, such that a compensation in length is possible even with various sizes of measuring resistors.

Figure 2:
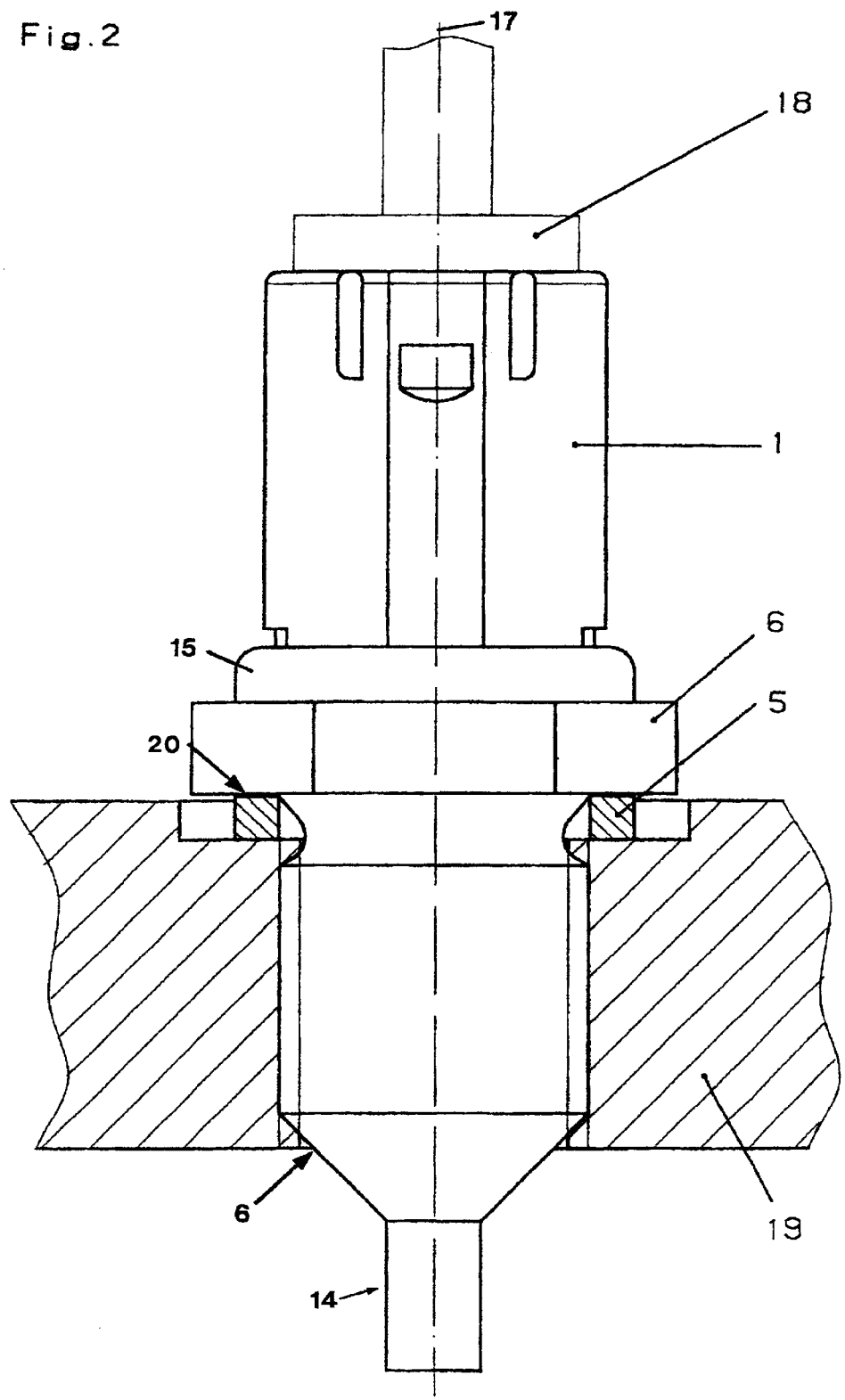
FIG. 2 is a longitudinal view of the sensor according to FIGS. 1a, 1b, whose outer configuration is adapted to customer wishes, wherein a customer-specific housing as well as a customer-specific counter-plug are represented in fragmented view.

In accordance with FIG. 2, for conducting measurements the sensor is screwed into in a here schematically-represented measurement opening of a customer-specified housing with its closed end 14 along its longitudinal axis 17. The housing wall 19 of opening is shown partially broken-away, and the closed end 14 with the temperature sensor projects into the interior of the housing. The housing 6 with its metallic part is screwed into the measurement opening by means of an external thread, wherein the opening in the housing wall 19 is surrounded by a bearing surface for an annular sealing ring or an external seal 5. The sealing action is generated by an annular flange 20 of the housing 6, wherein the seal between the housing 19 and flange 20 is pressed along the longitudinal axis 17 when screwing in the housing 6. The pressing force is generated here by rotation, optionally using a torque wrench. A customer-specific counterplug 18, represented broken-away, is situated at the outer end of the arrangement.

In case of a possible defect or upon inspection, it is consequently possible in a simple manner to separate the complete sensor with housing and plug system from the measuring site, as well as the measuring lead, and to undertake an inspection or even exchange the complete sensor.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sensor for conducting a measurement, comprising at least one sensor element (7), a housing (6) enclosing the sensor element (7), the sensor element (7) being arranged in a region (14) of the housing (6) facing the measurement, contact pins (10) provided as current lead-ins to outer leads in a region of the housing (6) facing away from the sensor element (7), electrical connection leads (12) of the sensor element (7) being connected with the contact pins (10), and at least one spacing element (9) provided between the sensor element (7) and the contact pins (10), the spacing element (9) comprising electrically insulating material and having recesses (11) for guiding the connection leads (12) between the sensor element (7) and the contact pins (10), wherein the connection leads (12) protrude with their free ends from an end of the spacing element (9) facing away from the measurement, wherein the connection leads (12) extend up to contact pins (10) and are connected electrically and mechanically fast therewith, and wherein, viewed from the contact pins (10), the spacing element (9) tapers in cross section toward the sensor element (7), and the recesses (11) are arranged in opposite-lying lateral surfaces of the spacing element (9) and accommodate the connection leads (12) extending from the sensor element (7).

2. The sensor according to claim 1, wherein the contact pins (10) pass hermetically tight through the housing (6) to the outside.

3. The sensor according to claim 1, wherein the housing (6) is at least partially rotation symmetrical.

4. The sensor according to claim 1, wherein the housing (6) has a metal part facing the measurement and a plug system part (1) facing away from the measurement, the plug system part comprising substantially electrically insulating material.

5. The sensor according to claim 4, wherein the plug system part (1) is connected with the spacing element (9).

6. The sensor according to claim 4, wherein the electrically insulating material comprises plastic.

7. The sensor according to claim 1, wherein the sensor element (7) is a temperature-dependent measuring resistor comprising a substrate with an electrically insulating surface and a resistor layer situated thereon.

8. The sensor according to claim 1, which is a temperature sensor.

9. A sensor for conducting a measurement, comprising at least one sensor element (7), a housing (6) enclosing the sensor element (7), the sensor element (7) being arranged in a region (14) of the housing (6) facing the measurement, contact pins (10) provided as current lead-ins to outer leads in a region of the housing (6) facing away from the sensor element (7), electrical connection leads (12) of the sensor element (7) being connected with the contact pins (10), and at least one spacing element (9) provided between the sensor element (7) and the contact pins (10), the spacing element (9) comprising electrically insulating material and having recesses (11) for guiding the connection leads (12) between the sensor element (7) and the contact pins (10), wherein the connection leads (12) protrude with their free ends from an end of the spacing element (9) facing away from the measurement, wherein the connection leads (12) extend up to contact pins (10) and are connected electrically and mechanically fast therewith, and wherein the spacing element (9) is at least partially in a shape of a prism, where the recesses (11) are formed as grooves in lateral surfaces whose planes intersect outside the housing (6).

10. The sensor according to claim 9, wherein the contact pins (10) pass hermetically tight through the housing (6) to the outside.

11. The sensor according to claim 9, wherein the housing (6) is at least partially rotation symmetrical.

12. The sensor according to claim 9, wherein the housing (6) has a metal part facing the measurement and a plug system part (1) facing away from the measurement, the plug system part comprising substantially electrically insulating material.

13. The sensor according to claim 12, wherein the plug system part (1) is connected with the spacing element (9).

14. The sensor according to claim 12, the electrically insulating material comprises plastic.

15. The sensor according to claim 9, wherein the sensor element (7) is a temperature-dependent measuring resistor comprising a substrate with an electrically insulating surface and a resistor layer situated thereon.

16. The sensor according to claim 9, which is a temperature sensor.

* * * * *